(12) United States Patent
Xia

(10) Patent No.: US 11,848,831 B2
(45) Date of Patent: Dec. 19, 2023

(54) METHOD, DEVICE, AND SYSTEM FOR MANAGING NETWORK SERVICE

(71) Applicant: HUAWEI TECHNOLOGIES CO., LTD., Guangdong (CN)

(72) Inventor: Haitao Xia, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/829,172

(22) Filed: May 31, 2022

(65) Prior Publication Data
US 2022/0294708 A1    Sep. 15, 2022

Related U.S. Application Data

(63) Continuation of application No. PCT/CN2020/130266, filed on Nov. 20, 2020.

(30) Foreign Application Priority Data

Nov. 29, 2019 (CN) .......................... 201911211951.2

(51) Int. Cl.
*G06F 15/177* (2006.01)
*H04L 41/40* (2022.01)

(52) U.S. Cl.
CPC .................................. *H04L 41/40* (2022.05)

(58) Field of Classification Search
CPC ................................ H04L 41/40; H04L 41/50
(Continued)

(56) References Cited

U.S. PATENT DOCUMENTS

2016/0156513 A1\* 6/2016 Zhang ..................... H04L 67/10
                                                                     709/220
2016/0337329 A1\* 11/2016 Sood ........................ H04L 63/08
(Continued)

FOREIGN PATENT DOCUMENTS

CN    108337110 A    \*    7/2018    ............. H04L 41/00
CN    108347343 A    \*    7/2018    ......... H04L 41/0813
(Continued)

OTHER PUBLICATIONS

3GPP TR 32.842 V2.0.0 (Sep. 2015)3rd Generation Partnership Project;Technical Specification Group Services and System Aspects;Telecommunication management;Study on network management of virtualized networks (Release 13), Total 84 Pages.
(Continued)

*Primary Examiner* — Liang Che A Wang
(74) *Attorney, Agent, or Firm* — James Anderson Harrison

(57) ABSTRACT

This disclosure discloses a method for managing a network service. The method includes: An OSS/a BSS obtains a first intent object from an intent template, determines description information of a first service intent that corresponds to the first intent object, and sends an intent creation request to an NFVO. The NFVO may determine, from a first mapping relationship based on an identifier of the intent template, a first network functions virtualization management and orchestration NFV MANO object corresponding to the first intent object, determines, from a second mapping relationship, a first NFV MANO operation corresponding to a first intent action, and then performs management indicated by the first NFV MANO operation on the first NFV MANO object. In a technical solution of this disclosure, an NFV MANO object is managed based on an intent. This simplifies
(Continued)

management operation logic of the OSS/BSS, and reduces complexity of managing an NFV network.

23 Claims, 8 Drawing Sheets

(58) Field of Classification Search
USPC .................................................. 709/220, 223
See application file for complete search history.

(56) References Cited

U.S. PATENT DOCUMENTS

| | | | |
|---|---|---|---|
| 2016/0381150 A1* | 12/2016 | Rajagopal | H04L 41/40 709/223 |
| 2018/0324261 A1* | 11/2018 | Yi | H04L 67/51 |
| 2019/0174449 A1* | 6/2019 | Shan | H04W 60/00 |

FOREIGN PATENT DOCUMENTS

| | | | | |
|---|---|---|---|---|
| CN | 108347343 A | | 7/2018 | |
| CN | 108429631 A | | 8/2018 | |
| CN | 110311798 A | * | 10/2019 | ......... G06F 9/45558 |
| CN | 110311798 A | | 10/2019 | |
| CN | 112583615 A | * | 3/2021 | ......... G06F 9/45558 |
| EP | 3432515 A1 | | 1/2019 | |
| JP | 2018523434 A | | 8/2018 | |
| WO | 2016115844 A1 | | 7/2016 | |
| WO | 2017185303 A1 | | 11/2017 | |
| WO | WO-2017185303 A1 | * | 11/2017 | ........... G06F 9/5077 |

OTHER PUBLICATIONS

Davide Borsatti et al.,"Intent-based Service Function Chaining on ETSI NFV Platforms", 2019 10th International Conference on the Network of the Future (NoF), Total 3 Pages.

Huawei,"Management architecture relation between slicing management functions and NFV-MANO", 3GPP TSG SA WG5 (Telecom Management) Meeting #115 S5-175130, Oct. 16-20, 2017, Busan, Korea,Total 3 Pages.

3GPP TR 28.812 V0.7.0 (Aug. 2019), 3rd Generation Partnership Project;Technical Specification Group Services and System Aspects;Telecommunication management; Study on scenarios for Intent driven management services for mobile networks(Release 16), Total 40 Pages.

Chao Wu et al: "Intent-based cloud service management", 2018 21st Conference on Innovation in Clouds, Internet and Networks and Workshops (ICIN), IEEE, Feb. 19, 2018 (Feb. 19, 2018), pp. 1-5, XP033368434, Total 5 Pages.

* cited by examiner

METHOD, DEVICE, AND SYSTEM FOR MANAGING NETWORK SERVICE

CROSS-REFERENCE TO RELATED APPLICATIONS

This application is a continuation of International Application No. PCT/CN2020/130266, filed on Nov. 20, 2020. The International Application claims priority to Chinese Application No. 201911211951.2, filed on Nov. 29, 2019. The disclosures of the aforementioned applications are hereby incorporated by reference in their entireties.

TECHNICAL FIELD

This disclosure relates to the field of communication technologies, and specifically, to a method, device, and system for managing a network service.

BACKGROUND

In a network functions virtualization management and orchestration (network function virtualisation management and orchestration, NFV MANO) system, model-driven and management policy-based management and orchestration automation is basically implemented. Distribution and execution of the management policy in the NFV MANO system reduces a probability that an operator maintenance team performs manual intervention by sending a management command on an operation platform of an operations support system/a business support system (operations support system/business support system, OSS/BSS). Each functional device in the NFV MANO system (for example, a network functions virtualization orchestrator (network functions virtualisation orchestrator, NFVO), a virtualized network function manager (virtualised network function manager, VNFM), or a virtualized infrastructure manager (virtualised infrastructure manager, VIM)) implements lifecycle management of an automated network service (network service, NS) or virtualized network function (virtualised network function, VNF) by executing data and a policy of fault management, configuration management, user management, performance management, security management (fault management, configuration management, accounting management, performance management, security management, FCAPS).

In a current policy management mechanism, functional devices of the OSS/BSS and NFV MANO have same awareness of logical details of the management policy. Therefore, maintenance personnel on an OSS/a BSS side need to fully understand and manage management policies of various layers in the NFV MANO system. This requires personnel who undertake policy making have very extensive experience in an NFV MANO service field. With continuous evolution of the NFV MANO system, increasingly more management-plane functions flood into and are integrated into the NFV MANO system, which results in increasingly complex operation and maintenance management of an NFV network on the OSS/BSS side.

SUMMARY

Embodiments of this disclosure provide a method for managing a network service, used to manage an NFV MANO object based on a service intent. This simplifies management operation logic of an OSS/a BSS, and reduces complexity of managing an NFV network. Embodiments of this disclosure further provide a corresponding device and system.

A first aspect of this disclosure provides a method for managing a network service, and the method is applied to a system for managing a network service. The system may be a system based on a communication architecture between an OSS/a BSS and an NFV MANO system, or may be a system based on a communication architecture between a first NFV MANO management domain and a second NFV MANO management domain. The method includes: A first management device receives an intent creation request sent by a second management device, where the intent creation request includes an identifier of an intent template and description information of a first service intent, and the description information of the first service intent includes a first intent object in the intent template; the first management device determines a first intent action from the description information of the first service intent; the first management device determines a first mapping relationship and a second mapping relationship based on the identifier of the intent template, where the first mapping relationship is a mapping relationship between an intent object and a network functions virtualization management and orchestration NFV MANO object, and the second mapping relationship is a mapping relationship between an intent action and an NFV MANO operation; the first management device determines, from the first mapping relationship, a first NFV MANO object corresponding to the first intent object, and determines, from the second mapping relationship, a first NFV MANO operation corresponding to the first intent action; and the first management device performs management indicated by the first NFV MANO operation on the first NFV MANO object, for example, creates an instance of the first NFV MANO object.

In the first aspect, the system for managing a network service includes the first management device and the second management device. The second management device may be the OSS/BSS, and the first management device may be an NFV orchestrator (NFV orchestrator, NFVO) in the NFV MANO system or a device that is in parallel with the NFVO and that can communicate with the OSS/BSS. Alternatively, the second management device is a first NFVO, and the first management device is a second NFVO. The first NFVO and the second NFVO are located in different management domains, and the first NFVO communicates with the second NFVO. The intent template may include a plurality of intent objects. Operation and maintenance personnel may select the first intent object from the intent template, and the selected intent object is the first intent object. Certainly, in addition to manual selection, the second management device may determine to select which intent objects as a first intent object. Information obtained by the second management device from the intent template may be information about the first intent object. The information about the first intent object may include a name, a type, an identifier, a description, and/or the like of the first intent object. The first intent object is related to a management service in a field of network operation and maintenance management. For example, for a management service of a deployment network, the first intent object may be a maximum quantity of users, an average quantity of users, service duration, a service location, a network latency, a bandwidth requirement, and the like of a target network. The description information of the first service intent that corresponds to the first intent object may be information describing the first service intent, for example, "providing a dedicated line service with a bandwidth of one gigabit and a network latency not exceeding 100 milliseconds for serving a maximum quantity of 20000 users within two kilometers around Wangfujing Commercial Street in Beijing from September 1 to September 8". The first management device stores a correspondence between the identifier of the intent template and each of the first mapping relationship and the second mapping relationship. The first NFV MANO object corresponding to the first intent object may be determined by using the first mapping relationship. The first NFV MANO operation corresponding to the first intent action may be determined by using the second mapping relationship, for example, the first intent action is "providing" in the description information of the first service intent. After determining the first NFV MANO operation, the first management device may determine, based on a type of the first NFV MANO operation, to perform the first NFV MANO operation by itself, or may send the first NFV MANO operation to a VNF manager (VNF manager, VNFM) or a virtualized infrastructure manager (virtualised infrastructure manager, VIM), to perform the first NFV MANO operation. It may be learned from the first aspect that the first management device may determine, based on the first mapping relationship and the second mapping relationship, the NFV MANO object and the NFV MANO operation that correspond to the description information of the service intent, so as to perform management. This simplifies management operation logic of the OSS/BSS, and reduces complexity of managing an NFV network.

In a possible implementation of the first aspect, the above step that the first management device performs management indicated by the first NFV MANO operation on the first NFV MANO object includes: The first management device sends the first NFV MANO object and the first NFV MANO operation to a third management device, where the first NFV MANO operation is used by the third management device to perform the management indicated by the first NFV MANO operation on the first NFV MANO object.

In this possible implementation, the first management device may be an NFVO, and the third management device may be a VNFM or a VIM. After determining the first NFV MANO operation, the NFVO may send the first NFV MANO operation to the VNFM or the VIM, to perform the first NFV MANO operation. In another possible implementation, the first management device is a device that is in parallel with the NFVO and that can communicate with the OSS/BSS, and the third management device is the NFVO, the VNFM, or the VIM. After determining the first NFV MANO operation, the device that is in parallel with the NFVO may send the first NFV MANO operation to the NFVO, the VNFM, or the VIM, to perform the first NFV MANO operation.

In a possible implementation of the first aspect, the method further includes: The first management device sends an intent creation response to the second management device, where the intent creation response includes an identifier of the first service intent.

In this possible implementation, after generating the first service intent, the first management device returns the identifier of the first service intent to the second management device. In this way, for subsequent management of the first service intent, the second management device may perform a management operation by using the identifier of the first service intent as an index.

In a possible implementation of the first aspect, the method further includes: The first management device receives an intent update request sent by the second management device, where the intent update request includes the identifier of the first service intent and update information of the first service intent; the first management device determines a second intent object and a second intent action from the update information; the first management device determines, from the first mapping relationship based on the identifier of the first service intent, a second NFV MANO object corresponding to the second intent object, and determines, from the second mapping relationship, a second NFV MANO operation corresponding to the second intent action; and the first management device performs an update management operation indicated by the second NFV MANO operation on the second NFV MANO object.

In this possible implementation, after the first service intent is created, the description information of the first intent object in the first service intent may be modified or partially deleted, or some more intent objects are selected from the intent template and added to the first service intent. In any manner, these operations for the first service intent may be collectively referred to as an update operation. When the update operation is performed, the second management device obtains the second intent object from the intent template, and then determines update information of the first service intent that corresponds to the second intent object. The second intent object may be a modified object in the first intent object, or may be an intent object that is newly selected from the intent template and that is not included in the first intent object. After the first service intent is created, the first management device may store a correspondence between the identifier of the intent template and the identifier of the first service intent. Therefore, the first mapping relationship and the second mapping relationship may also be found based on the identifier of the first service intent that is included in the intent update request, so as to determine the second NFV MANO object corresponding to the second intent object and the second NFV MANO operation corresponding to the second intent action, and update the management operation on the second NFV MANO object of the first service intent. Same as a creation process, an update process may be performed by the NFVO, or the second NFV MANO operation may be sent to the VNFM or the VIM for execution. It may be learned from this possible implementation that when management on the NFV network needs to be updated, the first management device may update a managed target only based on the received identifier of the first service intent and description information of the second intent object. This further simplifies operation processing.

In a possible implementation of the first aspect, the method further includes: The first management device receives an intent deletion request sent by the second management device, where the intent deletion request includes the identifier of the first service intent; the first management device determines, based on the identifier of the first service intent, the first NFV MANO object and the first NFV MANO operation that are determined when the first service intent is created; and the first management device cancels an execution result of performing the first NFV MANO operation on the first NFV MANO object.

In this possible implementation, when the first service intent is to be deleted, the second management device sends the intent deletion request to the first management device. The intent deletion request carries the identifier of the first service intent. The identifier of the first service intent may be used to determine the first NFV MANO operation performed on the first NFV MANO object when the first service intent is created. If an instance of the first NFV MANO object is created when the first service intent is created, canceling the execution result of performing the first NFV MANO operation on the first NFV MANO object indicates that the first management device terminates the instance of the first NFV MANO object. If the first management device performs a scale-out operation on the first NFV MANO object when the first service intent is created, canceling the execution result of performing the first NFV MANO operation on the first NFV MANO object indicates that the first management device performs, for the scale-out operation, a scale-in operation on the first NFV MANO object in an intent deletion process. If an update operation occurs before canceling is performed, an execution result after a previous update operation is canceled. That is, an execution result of performing the second NFV MANO operation on the second NFV MANO object is canceled. It may be learned from this possible implementation that when the first service intent needs to be deleted, the first management device may terminate a network-side instance or implement another management operation based on only the intent deletion request and the identifier of the first service intent that is carried in the intent deletion request. This further simplifies operation processing.

In a possible implementation of the first aspect, the method further includes: The first management device receives an intent query request sent by the second management device, where the intent query request includes the identifier of the first service intent, or the identifier of the first service intent and a filtering condition; the first management device searches for the first service intent based on the identifier of the first service intent; or the first management device searches for the first service intent based on the identifier of the first service intent, and determines, based on the filtering condition, content in the first service intent that meets the filtering condition; and the first management device sends the first service intent or the content in the first service intent that meets the filtering condition to the second management device.

In this possible implementation, when a query operation is performed, the second management device sends the identifier of the first service intent or another filtering condition that further narrows a search range, and the first management device may find content required by the second management device. The filtering condition may be a time period, an identifier of a to-be-searched first intent object, or the like. It may be learned from this possible implementation that when the first service intent needs to be queried, the first management device may find the first service intent based on only the intent query request and the identifier of the first service intent that is carried in the intent query request. This further simplifies operation processing.

In a possible implementation of the first aspect, the first NFV MANO object includes a network service (network service, NS), a virtualized network function (virtualised network function, VNF), or a virtual resource. The first NFV MANO operation includes instantiation of the first NFV MANO object, scaling out/in of the first NFV MANO object, update of the first NFV MANO object, termination of the first NFV MANO object, or healing (heal) of the first NFV MANO object.

A second aspect of this disclosure provides a method for managing a network service, and the method is applied to a system for managing a network service. The system may be a system based on a communication architecture between an OSS/a BSS and an NFV MANO system, or may be a system based on a communication architecture between a first NFV MANO management domain and a second NFV MANO management domain. The system for managing a network service includes a first management device and a second management device. The method includes: The second management device obtains a first intent object from an intent template, determines description information of a first service intent that corresponds to the first intent object, and then sends an intent creation request to the first management device. The intent creation request is used to request to manage a network service corresponding to the first service intent. The intent creation request includes an identifier of the intent template and the description information of the first service intent.

In the second aspect, the second management device may be the OSS/BSS, and the first management device may be an NFV orchestrator (NFV orchestrator, NFVO) or a device that is in parallel with the NFVO and that can communicate with the OSS/BSS. Alternatively, the second management device is a first NFVO, and the first management device is a second NFVO. The first NFVO and the second NFVO are located in different management domains, and the first NFVO communicates with the second NFVO. The first NFVO and the second NFVO may communicate through an Or-Or interface. The intent template may include a plurality of intent objects. Operation and maintenance personnel may select the first intent object from the intent template, and the selected intent object is the first intent object. Certainly, in addition to manual selection, the second management device may determine, in an artificial intelligence manner, to select which intent objects as a first intent object. Information obtained by the second management device from the intent template may be information about the first intent object. The information about the first intent object may include a name, a type, an identifier, a description, and/or the like of the first intent object. The first intent object is related to a management service in a field of network operation and maintenance management. For example, for a management service of a deployment network, the first intent object may be a maximum quantity of users, an average quantity of users, service duration, a service location, a network latency, a bandwidth requirement, and the like of a target network. The description information of the first service intent that corresponds to the first intent object may be information describing the first service intent, for example, "providing a dedicated line service with a bandwidth of one gigabit and a network latency not exceeding 100 milliseconds for serving a maximum quantity of 20000 users within two kilometers around Wangfujing Commercial Street in Beijing from September 1 to September 8". The first management device stores a correspondence between the identifier of the intent template and each of a first mapping relationship and a second mapping relationship. The first mapping relationship is a mapping relationship between an intent object and a network functions virtualization management and orchestration NFV MANO object. The second mapping relationship is a mapping relationship between an intent action and an NFV MANO operation. A first NFV MANO object corresponding to the first intent object may be determined by using the first mapping relationship. A first NFV MANO operation corresponding to a first intent action may be determined by using the second mapping relationship, for example, the first intent action is "providing" in the description information of the first service intent. After determining the first NFV MANO operation, the first management device may determine, based on a type of the first NFV MANO operation, to perform the first NFV MANO operation by itself, or may send the first NFV MANO operation to a VNF manager (VNF manager, VNFM) or a virtualized infrastructure manager (virtualised infrastructure manager, VIM), to perform the first NFV MANO operation. It may be learned from the second aspect that, on an OSS/a BSS side, an NFV MANO object on a first management device side may be managed by using the intent template and the intent object. This simplifies management operation logic of the OSS/ BSS, and reduces complexity of managing an NFV network.

In a possible implementation of the second aspect, the above step that the second management device obtains a first intent object from an intent template includes: The second management device obtains, in response to a selection operation on an intent object in the intent template, the first intent object selected in the intent template.

In this possible implementation, the OSS/BSS may provide the intent template for operation and maintenance personnel, so that the operation and maintenance personnel can select an intent object by using the intent template, and further, the OSS/BSS can create an intent based on the selected intent object, so as to guide a subsequent NS management operation of the NFV MANO system by using the intent.

In another possible implementation, an intent may alternatively be created by using an automation solution. In this automation solution, the OSS/BSS uses an intent object provided in the intent template, and independently creates an intent based on information such as performance and a status that are of an NS in the management domain and that are obtained by the OSS/BSS from the NFVO, so as to guide a subsequent NS management operation of the NFV MANO system by using the intent.

In a possible implementation of the second aspect, the method further includes: The second management device determines the corresponding intent template based on the management service in the field of network operation and maintenance management.

In this possible implementation, intent objects included in different intents may be different, or may partially overlap. Managing different services by using different intent templates helps improve service management efficiency.

In a possible implementation of the second aspect, the method further includes: The second management device receives an intent creation response sent by the first management device. The intent creation response includes an identifier of the first service intent.

In this possible implementation, after generating the first service intent, the first management device may return the identifier of the first service intent to the second management device. In this way, for subsequent management of the first service intent, the second management device may perform a management operation by using the identifier of the first service intent as an index. Therefore, management complexity is reduced.

In a possible implementation of the second aspect, the method further includes: The second management device obtains a second intent object from the intent template, where the second intent object is included in the first intent object, or the second intent object is at least one intent object in the intent template except the first intent object; the second management device determines update information of the first service intent, where the update information includes description information of the first service intent that corresponds to the second intent object; and the second management device sends an intent update request to the first management device, where the intent update request is used to request to update the network service corresponding to the first service intent, and the intent update request includes the identifier of the first service intent and the update information of the first service intent.

In this possible implementation, after the first service intent is created, the description information of the first intent object in the first service intent may be modified or partially deleted, or some more intent objects are selected from the intent template and added to the first service intent. In any manner, these operations for the first service intent may be collectively referred to as an update operation. When the update operation is performed, the second management device obtains the second intent object from the intent template, and then determines update information of the first service intent that corresponds to the second intent object. The second intent object may be a modified object in the first intent object, or may be an intent object that is newly selected from the intent template and that is not included in the first intent object. After the first service intent is created, the first management device may store a correspondence between the identifier of the intent template and the identifier of the first service intent. Therefore, the first mapping relationship and the second mapping relationship may also be found based on the identifier of the first service intent that is included in the intent update request, so as to determine a second NFV MANO object corresponding to the second intent object and a second NFV MANO operation corresponding to a second intent action, and update a management operation on the second NFV MANO object of the first service intent. Same as a creation process, an update process may be performed by the NFVO, or the second NFV MANO operation may be sent to the VNFM or the VIM for execution. It may be learned from this possible implementation that when management of the NFV network needs to be updated, the second management device may update a managed target only by sending the identifier of the first service intent and the description information of the second intent object. This further simplifies operation processing.

In a possible implementation of the second aspect, the method further includes: The second management device sends an intent deletion request to the first management device. The intent deletion request includes the identifier of the first service intent. The intent deletion request is used to request to cancel an operation performed on the network service corresponding to the first service intent.

In this possible implementation, when the first service intent is to be deleted, the second management device sends the intent deletion request to the first management device. The intent deletion request carries the identifier of the first service intent. The identifier of the first service intent may be used to determine the first NFV MANO operation performed when the first service intent is created. If an instance of the first NFV MANO object is created when the first service intent is created, canceling an execution result of performing the first NFV MANO operation on the first NFV MANO object indicates that the first management device terminates the instance of the first NFV MANO object. If the first management device performs a scale-out operation on the first NFV MANO object when the first service intent is created, canceling an execution result of performing the first NFV MANO operation on the first NFV MANO object indicates that the first management device performs, for the scale-out operation, a scale-in operation on the first NFV MANO object in an intent deletion process. It may be learned from this possible implementation that when the first service intent needs to be deleted, the second management device only needs to send the intent deletion request, where the intent deletion request carries the identifier of the first service intent, so as to terminate a network-side instance or implement another management operation. This further simplifies operation processing.

In a possible implementation of the second aspect, the method further includes: The second management device sends an intent query request to the first management device, where the intent query request includes the identifier of the first service intent, or the identifier of the first service intent and a filtering condition, the identifier of the first service intent is used to search for the first service intent, and the filtering condition is used to determine content in the first service intent that meets the filtering condition; and the second management device receives the first service intent or the content in the first service intent that meets the filtering condition, which is sent by the first management device.

In this possible implementation, when a query operation is performed, the second management device sends the identifier of the first service intent or another filtering condition that further narrows a search range, and the first management device may find content required by the second management device. It may be learned from this possible implementation that when the first service intent needs to be queried, the second management device only needs to send the intent query request, and the intent query request carries the identifier of the first service intent, so that the first service intent can be retrieved. This further simplifies operation processing.

A third aspect of this disclosure provides a management device, configured to perform the method according to any one of the first aspect or the possible implementations of the first aspect. Specifically, the management device includes modules or units configured to perform the method according to any one of the first aspect or the possible implementations of the first aspect.

A fourth aspect of this disclosure provides a management device, configured to perform the method according to any one of the second aspect or the possible implementations of the second aspect. Specifically, the management device includes modules or units configured to perform the method according to any one of the second aspect or the possible implementations of the second aspect.

A fifth aspect of this disclosure provides a management device, including: at least one processor, a memory, a transceiver, and computer executable instructions that are stored in the memory and that can run on the processor. When the computer executable instructions are executed by the processor, the processor performs the method according to any one of the first aspect or the possible implementations of the first aspect.

A sixth aspect of this disclosure provides a management device, including: at least one processor, a memory, a transceiver, and computer executable instructions that are stored in the memory and that can run on the processor. When the computer executable instructions are executed by the processor, the processor performs the method according to any one of the second aspect or the possible implementations of the second aspect.

A seventh aspect of this disclosure provides a computer-readable storage medium storing one or more computer executable instructions. When the one or more computer executable instructions are executed by a processor, the processor performs the method according to any one of the first aspect or the possible implementations of the first aspect.

An eighth aspect of this disclosure provides a computer-readable storage medium storing one or more computer executable instructions. When the one or more computer executable instructions are executed by a processor, the processor performs the method according to any one of the second aspect or the possible implementations of the second aspect.

A ninth aspect of this disclosure provides a computer program product storing one or more computer executable instructions. When the one or more computer executable instructions are executed by a processor, the processor performs the method according to any one of the first aspect or the possible implementations of the first aspect.

A tenth aspect of this disclosure provides a computer program product storing one or more computer-executable instructions. When the one or more computer-executable instructions are executed by a processor, the processor performs the method according to any one of the second aspect or the possible implementations of the second aspect.

The management device described in the third aspect and the sixth aspect may alternatively be a chip applied to the management device, or another combination device and component that have the function of the management device.

The receiving unit in the management device may be a communication interface, for example, an input/output (input/output, I/O) interface. The processing unit may be a processor, for example, a central processing unit (central processing unit, CPU). The sending unit may be a communication interface.

For technical effects brought by any one of the third aspect, the fifth aspect, the seventh aspect, the ninth aspect, or any possible implementation thereof, refer to technical effects brought by the first aspect or different possible implementations of the first aspect. Details are not described herein again.

For technical effects brought by any one of the fourth aspect, the sixth aspect, the eighth aspect, the tenth aspect, or any possible implementation thereof, refer to technical effects brought by the second aspect or different possible implementations of the second aspect. Details are not described herein again.

An eleventh aspect of this disclosure provides a system for managing a network service, including a first management device and a second management device. The first management device may perform the method according to any one of the first aspect or the possible implementations of the first aspect. The second management device may perform the method according to any one of the second aspect or the possible implementations of the second aspect. For a technical effect brought by the system for managing a network service, refer to the technical effect brought by the first aspect or different possible implementations of the first aspect. Details are not described herein.

In the technical solutions provided in all the aspects, the first management device and the second management device may be deployed on a physical computer, or may be deployed on a virtual computer.

DESCRIPTION OF EMBODIMENTS

The following describes embodiments of this disclosure with reference to the accompanying drawings. It is clear that the described embodiments are merely some but not all of embodiments of this disclosure. A person of ordinary skill may know that, with development of technologies and emergence of new scenarios, technical solutions provided in embodiments of this disclosure are also applicable to similar technical problems.

In the specification, claims, and accompanying drawings of this disclosure, the terms "first", "second", and so on are intended to distinguish between similar objects but do not necessarily indicate a specific order or sequence. It should be understood that data termed in such a way are interchangeable in proper circumstances, so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

An embodiment of this disclosure provides a method for managing a network service, used to manage an NFV MANO object based on a service intent. This simplifies management operation logic of an OSS/a BSS, and reduces complexity of managing an NFV network. Embodiments of this disclosure further provide a corresponding device and system. Detailed descriptions are separately provided in the following.

Figure 1:
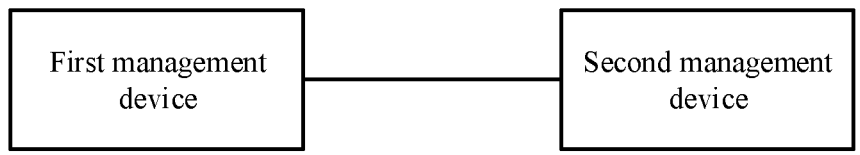
FIG. 1 is a schematic diagram of a structure of a system for managing a network service according to an embodiment of this disclosure.

FIG. 1 is a schematic diagram of an embodiment of a system for managing a network service according to an embodiment of this disclosure.

As shown in FIG. 1, the system for managing a network service provided in this embodiment of this disclosure includes a first management device and a second management device. The second management device may be an operations support system/a business support system (operations support system/business support system, OSS/BSS). The first management device may be an NFV orchestrator (NFV orchestrator, NFVO) in a network functions virtualization management and orchestration (network function virtualisation management and orchestration, NFV MANO) or a device that is in parallel with the NFVO and that can communicate with the OSS/BSS. Alternatively, the second management device may be a first NFVO, the first management device is a second NFVO, and the two NFVOs may belong to a superior-subordinate relationship. The first NFVO and the second NFVO belong to different management domains, and the first NFVO and the second NFVO may communicate through an Or-Or interface.

Network functions virtualization (network function virtualisation, NFV) means that a telecommunication network operator, by referring to a virtualization technology in an information technology (information technology, IT) field, performs software and hardware decoupling on implementing of some telecommunication network functions (for example, a core network function) of a common server, switch, and memory, so as to implement rapid and efficient deployment and operation of a network service (network service, NS), and reduce capital expenditure and operating costs. With disclosure of an NFV technology, the telecommunication network functions are implemented in a software manner, can run on hardware of the common server, and can be migrated and instantiated as required.

Standardization of NFV mainly focuses on dynamic management and orchestration (management and orchestration, MANO) of a network service, a virtualized network function (virtualised network function, VNF), and a virtual resource. For an architecture of an NFV-based system for managing a network service provided in this disclosure, refer to FIG. 2A for understanding.

Figure 2A:
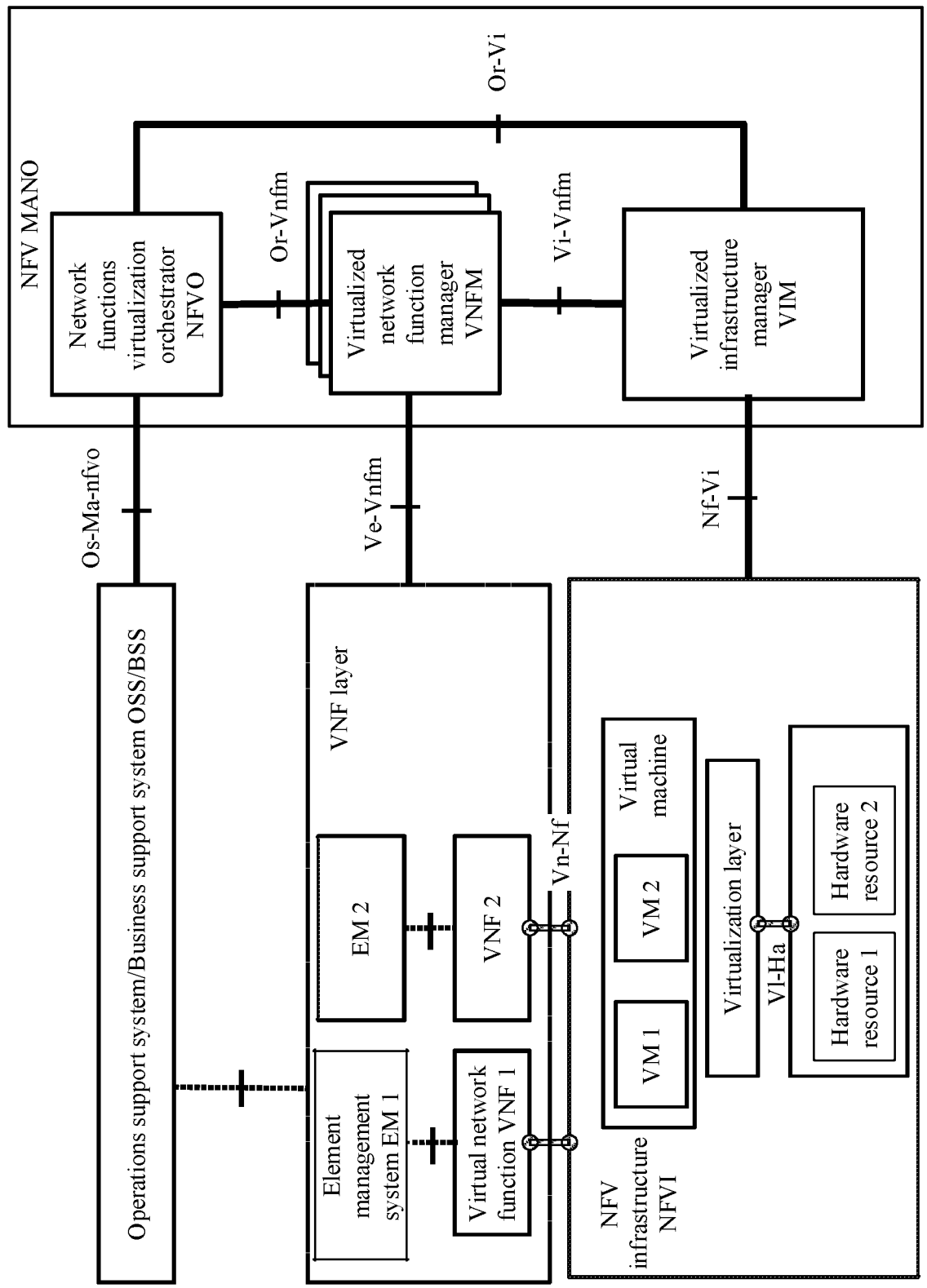
FIG. 2A is a schematic diagram of another structure of a system for managing a network service according to an embodiment of this disclosure.

As shown in FIG. 2A, the NFV-based system for managing a network service includes an operations support system/a business support system OSS/BSS, an NFV MANO system, an element management system (element manager, EM) 1, an EM 2, a VNF 1, a VNF 2, and NFV infrastructure (NFV Infrastructure, NFVI). The NFVI includes a virtual machine (virtual machine, VM) 1, a VM 2, a hardware resource 1, and a hardware resource 2. The hardware resource is used by the virtual machine through a virtualization layer. The EM 1 manages the VNF 1 and the EM 2 manages the VNF 2. The OSS/BSS can access the EM 1 and the EM 2.

The element management system (element manager, EM) performs a fault management, configuration management, user management, performance management, security management (fault management, configuration management, accounting management, performance management, security management, FCAPS) function for the VNF.

The VNF corresponds to a physical network function (physical network function, PNF) in a conventional non-virtualized network, such as a virtualized evolved packet core (evolved packet core, EPC) device or a 5G core (5G core, 5GC) network device, for example, a session management function (session management function, SMF), a mobility management entity (mobility management entity, MME), a serving gateway (serving gateway, SGW), and a packet gateway (packet gateway, PGW). A functional behavior and a functional status of a network functional device are independent of whether it is virtualized. The NFV technology may have a same functional behavior and external interface as a conventional network functional device based on the VNF and the PNF.

The NFV infrastructure (NFV Infrastructure NFVI) is an infrastructure layer of an NFV function, and includes a hardware resource, a virtual resource, and a virtualization layer.

The NFV MANO system includes an NFV orchestrator (NFV orchestrator, NFVO), a VNF manager (VNF manager, VNFM), and a virtualized infrastructure manager (virtualised infrastructure manager, VIM). The NFVO communicates with the VNFM through an Or-Vnfm interface. The NFVO communicates with the VIM through an Or-Vi interface. The VNFM communicates with the VIM through a Vi-Vnfm interface. The OSS/BSS communicates with the NFVO through an Os-Ma-nfvo interface. The VNFM communicates with the NFV through a Ve-Vnfm interface. The VIM communicates with the NFVI through an Nf-Vi interface.

The NFVO is configured to: implement management of a network service descriptor (network service descriptor, NSD), processing of a virtualized network function forwarding graph (VNF forwarding graph, VNFFG), and lifecycle management of a network service, and cooperate with the VNFM to implement lifecycle management of the VNF; and has a global view function of a virtual resource.

The VNF manager (VNF manager, VNFM) is configured to perform lifecycle management of the VNF, including management of a virtualized network function descriptor (VNF descriptor, VNFD), instantiation of the VNF, scaling out/in of a VNF instance (including scaling out/up scaling out/up and scaling in/down scaling in/down), healing (healing) of the VNF instance, and termination of the VNF instance. The VNFM further supports receiving of a scale out/in (scale out/in) policy delivered by the NFVO, to implement automatic scaling out/in of the VNF.

The virtualized infrastructure manager (virtualised infrastructure manager, VIM) is mainly responsible for managing virtualized resources at an infrastructure layer, such as virtual computing, storage, reservation and allocation of a network resource, monitoring of a virtual resource status, fault reporting, and providing a virtualized resource pool for an upper-layer disclosure.

Figure 2B:
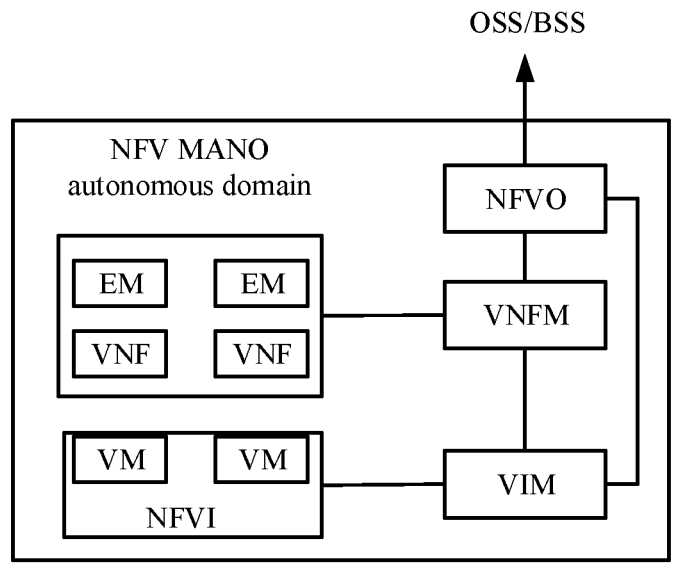
FIG. 2B is a schematic diagram of a structure of an NFV MANO system according to an embodiment of this disclosure.
Figure 2C:
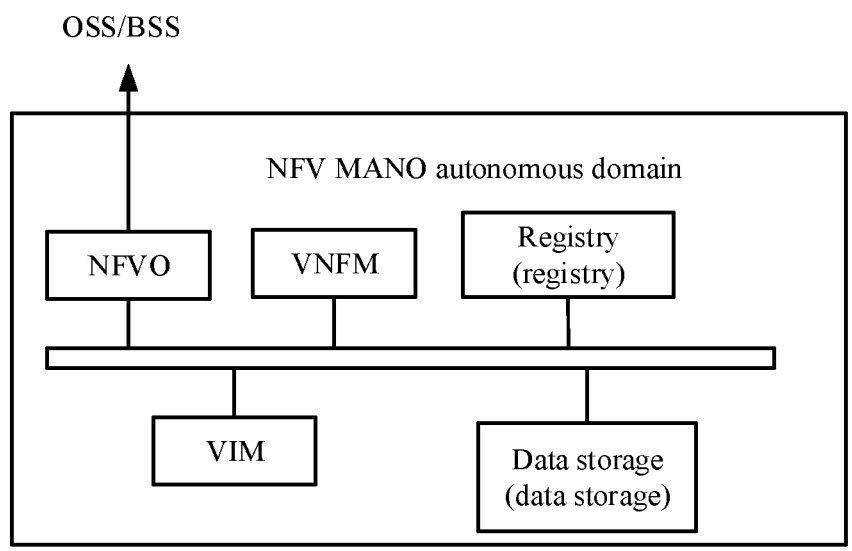
FIG. 2C is a schematic diagram of another structure of an NFV MANO system according to an embodiment of this disclosure.

In this embodiment of this disclosure, functions of the NFV MANO system are considered as a whole. For both a point-to-point reference point-based hierarchical management architecture shown in FIG. 2B and a service-based architecture shown in FIG. 2C, the NFVO is used as an entry of the NFV MANO system to manage an NFV MANO intent for the OSS/BSS. As a whole, the NFV MANO functions may also be referred to as an NFV MANO autonomous domain or management domain. For a structure in FIG. 2B, refer to the description in FIG. 2A for understanding. In FIG. 2C, the service-based architecture is used, and all functional devices are connected to a bus. For a structure in FIG. 2C, also refer to that in FIG. 2A for understanding. In FIG. 2C, a registry (registry) functional device and a data storage (data storage) device are further included.

The foregoing describes a structure of the system for managing a network service (a service resource). Based on the system for managing a network service, an embodiment of this disclosure provides a method for managing a network service. The method starts from an interaction interface (Os-Ma-nfvo) between the OSS/BSS and the NFVO. By applying this method, the OSS/BSS is free from complex logic of managing an MANO policy, so as to manage and maintain an intent for managing the NFV MANO. Therefore, simplified management is implemented in a user interface, and complexity of managing an NFV network is reduced.

Based on the method for managing a network service provided in this embodiment of this disclosure, operations such as creating, updating, querying, and deleting a service intent may be completed. A first management device and a second management device in the following described method embodiments may be understood with reference to the description in FIG. 1.

Figure 3:
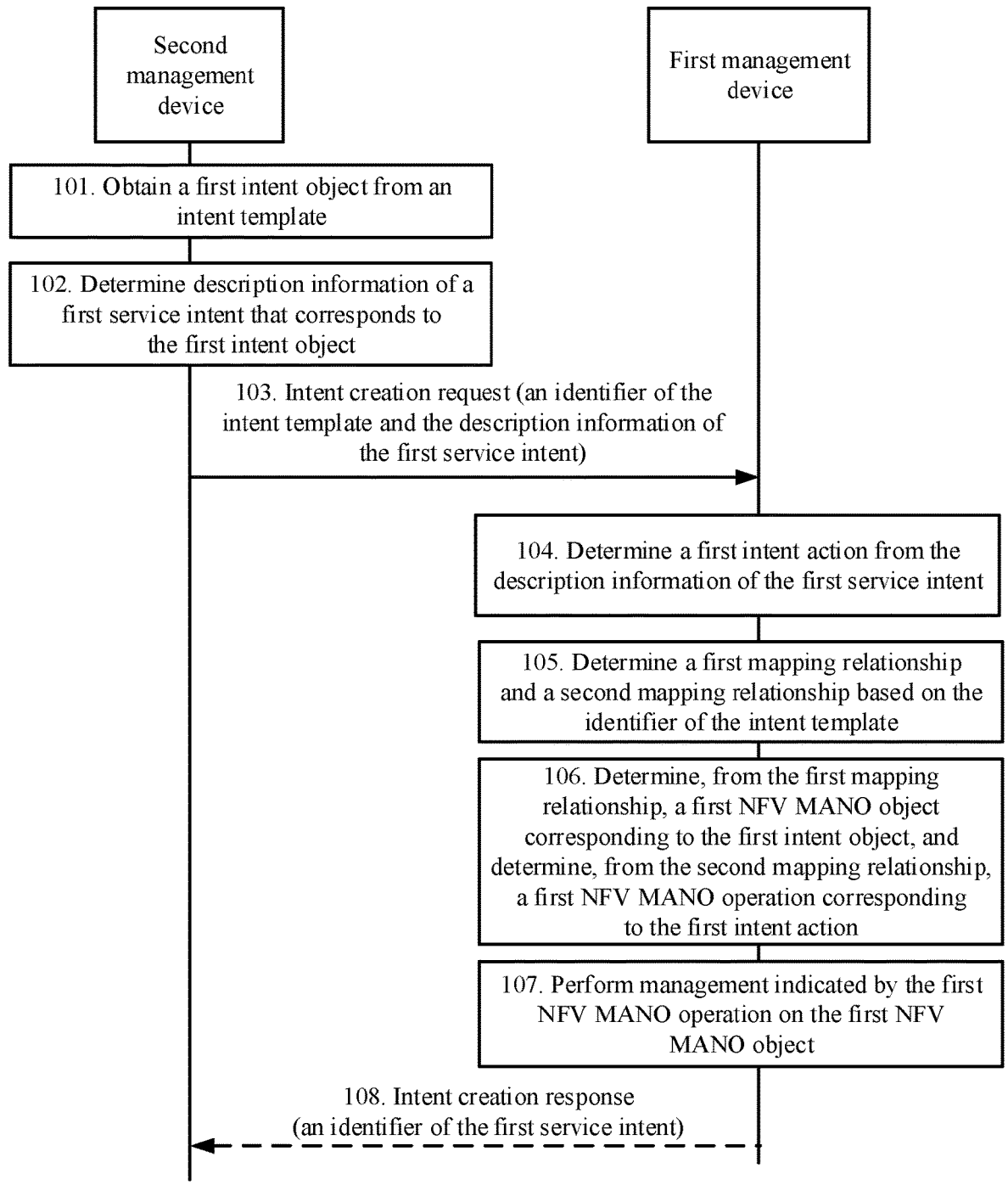
FIG. 3 is a schematic diagram of an embodiment of a method for managing a network service according to an embodiment of this disclosure.

With reference to FIG. 3, the following describes an embodiment of a method for managing a network service according to an embodiment of this disclosure.

As shown in FIG. 3, the embodiment of the method for managing a network service according to an embodiment of this disclosure may include:

101. A second management device obtains a first intent object from an intent template.

A service intent is described by using the intent template. The service intent corresponds to a management service in a field of network operation and maintenance management. That is, the service intent describes an objective of a management service activity in the field of network operation and maintenance management from a perspective of a user in the field. For example, deployment and operation of a network device, fault detection and root cause locating of a network, and network capacity management belong to different management service activities in the field of network operation and maintenance management. These different management service activities may be described, by pre-customizing different intent templates, as service intents related to the management service activities.

The intent template includes intent metadata (metadata) information of the management service. The intent template may be specifically a list of intent objects in the service field, and an OSS/a BSS describes an intent based on the intent object provided in the intent template. For example, the intent objects include but are not limited to a quantity range of users of a target NFV network, a location requirement, service duration (or a validity period) of an NFV network, and quality of service of the NFV network.

The intent template may include a plurality of intent objects. Operation and maintenance personnel may select the first intent object from the intent template, and the selected intent object is the first intent object. Further, the OSS/BSS may create an intent based on the selected intent object, so as to guide a subsequent NS management operation of an NFV MANO system by using the intent. Certainly, in addition to manual selection, the second management device may automatically determine to select which intent objects as a first intent object. For example, by using the intent object provided in the intent template, the OSS/BSS independently creates an intent based on information such as performance and a status that are of an NS in a management domain and that are obtained by the OSS/BSS from an NFVO, so as to guide a subsequent NS management operation of an NFV MANO system by using the intent. Information obtained by the second management device from the intent template may be information about the first intent object. The information about the first intent object may include a name, a type, an identifier, a description, and/or the like of the first intent object. The first intent object is related to the management service in the field of network operation and maintenance management, for example, a management service of a deployment network. In a service field of NFV MANO, the first intent object includes but is not limited to: a quantity range of users of a target NFV network, where the quantity range of users may include a maximum quantity of users or an average quantity of users, and the quantity range of users is used to determine a target capacity of the NFV network; service duration of an NFV network service, which may include, for example, a service start time and a service end time of the network service, where the service duration is used to determine the target capacity of the NFV network; a deployment location requirement of the NFV network service; and quality of service (quality of service, QoS) required by the NFV network service, such as a network latency and a bandwidth requirement.

102. The second management device determines description information of a first service intent that corresponds to the first intent object.

The description information of the first service intent that corresponds to the first intent object may be input by the operation and maintenance personnel, or may be determined by the second management device based on a network situation.

For example, corresponding to four intent objects in step 101, that is, the quantity range of users of a target NFV network, the location requirement, the service duration of an NFV network, and the quality of service of the NFV network, the description information of the first service intent may be, for example, "providing a dedicated line service with a bandwidth of one gigabit (quality of service) and a network latency not exceeding 100 milliseconds (quality of service) for serving a maximum quantity of 20000 users (a quantity of users) within two kilometers around Wangfujing Commercial Street in Beijing (a location requirement) from September 1 to September 8 (service duration)".

103. The second management device sends an intent creation request to a first management device.

The intent creation request includes an identifier of the intent template and the description information of the first service intent.

104. After receiving the intent creation request, the first management device determines a first intent action from the description information of the first service intent.

In step 104, the first intent object may be further determined.

The first management device may determine a first intent object that represents a location by using the "two kilometers around Wangfujing Commercial Street in Beijing", determine a first intent object that represents a range of served users by using the "serving a maximum quantity of 20000 users", determine a first intent object that represents a network latency by using the "network latency not exceeding 100 milliseconds", determine a first intent object that represents a bandwidth by using the "dedicated line service with a bandwidth of one gigabit", and determine a first intent object that represents service duration by using "from September 1 to September 8". The first management device may further determine, based on "providing", that the first intent action corresponding to the description information of the intent is "providing or deploying".

105. The first management device determines a first mapping relationship and a second mapping relationship based on an identifier of the intent template.

The first mapping relationship is a mapping relationship between an intent object and a network functions virtualization management and orchestration NFV MANO object. The second mapping relationship is a mapping relationship between an intent action and an NFV MANO operation.

The NFV MANO system may include an intent engine (Intent Engine). The intent engine is a database that stores and maintains an intent model, and maps an MANO management intent transferred by the OSS/BSS to a management operation to be performed by the NFV MANO system. The intent engine may be located in the NFVO, or may be located outside the NFVO as an independent logical function. The NFVO may access the intent engine through an interface. The database includes a mapping relationship between an intent object and an NFV managed object, and the mapping relationship may be referred to as the first mapping relationship. The database includes a mapping relationship between an intent action in the service intent and an NFV MANO operation, and the mapping relationship may be referred to as the second mapping relationship.

For examples of the first mapping relationship and the second mapping relationship, refer to Table 1 and Table 2 for understanding.

TABLE 1

Mapping relationship between an intent object and an NFV MANO object

| Intent object | NFV MANO object |
| --- | --- |
| Quantity of users | Capacity, resource quota, instantiation/scale level, and the like of a network service |
| Location | Location constraint and affinity/anti-affinity |
| Description | rule of a network service |
| Bandwidth and latency description | QoS configuration and policy configuration of a network service |

| Mapping relationship between an intent action and an NFV MANO operation | |
| --- | --- |
| Intent action | NFV MANO operation |
| Provide/deploy | Instantiate, create, and load |
| Scale out/Scale in | Scale out/in (Scale out/in) and update |
| Cancel | Terminate and delete |

Table 1 and Table 2 are merely examples for description. Actually, there may be more intent objects, and each intent object may correspond to one or more NFV MANO objects. There may be alternatively more intent actions, and each intent action may correspond to one or more NFV MANO operations.

106. The first management device determines, from the first mapping relationship, a first NFV MANO object corresponding to the first intent object, and determines, from the second mapping relationship, a first NFV MANO operation corresponding to the first intent action.

An object of the first NFV MANO operation is the first NFV MANO object, that is, the first NFV MANO operation may be performed for the first NFV MANO object.

Several first intent objects in step 104: the location, the maximum quantity of users, the network latency, and the bandwidth each may be used to determine a corresponding first NFV MANO object from the first mapping relationship. An NFV MANO operation corresponding to a first intent action "provide" may be creating a VNF instance.

If the VNF instance may be created by a VNFM, the NFVO serving as the first management device may send the first NFV MANO operation to the VNFM, so that the VNFM controls creation of the VNF instance.

If the first NFV MANO operation is performed by another VIM, the NFVO serving as the first management device may send the first NFV MANO operation to the VIM, and the VIM performs a corresponding operation.

If the first NFV MANO operation is performed by the NFVO, the first NFV MANO operation is directly performed by the NFVO.

The VNFM or the VIM may also be referred to as a third management device.

The description information of the intent may be mapped to the following NFV MANO management operation after being translated by the intent engine.

(a) One network service (NS) is instantiated, an instantiation level of a target capacity of the NS, namely, the maximum quantity of 20000 users is 3, and a resource quota used by the NS is a.

(b) A network service description (NSD) template is loaded. The network service description template includes: metadata information required for instantiating the NS, for example, a capacity and a resource quota that are supported by an NS instance, and an affinity/anti-affinity rule of a member VNF constituting the NS, that is, whether different VNFs are deployed in a same data center or a plurality of different data centers; and a QoS requirement of a network resource required for instantiating the NS, for example, a bandwidth of one gigabit, and a transmission latency less than or equal to 100 ms.

(c) Members VNF 1, VNF 2, and VNF 3 that constitute the NS are instantiated, and a service level used by the member VNF 3 is allocated based on the instantiation level of the NS.

(d) A VNF description (VNFD) template is loaded for each member VNF. The VNF description template includes: metadata information required for instantiating the VNF, for example, a capacity and a resource quota supported by a VNF instance, and a location constraint of deploying the VNF instance, for example, virtual resources can be selected from only several data centers in Beijing to create the VNF instance.

(e) Because there is a need for a dedicated line service, before the NS is instantiated, a host in the data center determines and reserves, based on NS deployment information described in the NSD, virtual computing, storage, and network resources required for deploying the NS.

After the operations described in (a) to (e), a network service corresponding to the first service intent of the above example is created.

107. The first management device performs management indicated by the first NFV MANO operation on the first NFV MANO object.

Step 107 may be performed by the first management device. Alternatively, the first management device may send the first NFV MANO object and the first NFV MANO operation to the third management device, and then the third management device performs the management indicated by the first NFV MANO operation on the first NFV MANO object.

The first management device may be the NFVO, and the third management device may be the VNFM or the VIM. After determining the first NFV MANO operation, the NFVO may send the first NFV MANO operation to the VNFM or the VIM, to perform the first NFV MANO operation. The first management device may alternatively be a device that is in parallel with the NFVO and that can communicate with the OSS/BSS, and the third management device is the NFVO, the VNFM, or the VIM. After determining the first NFV MANO operation, the device that is in parallel with the OSS/BSS and that can communicate with the OSS/BSS may send the first NFV MANO operation to the NFVO, the VNFM, or the VIM, to perform the first NFV MANO operation.

After the first service intent is created, the first management device may perform step 108.

108. The first management device sends an intent creation response to the second management device, where the intent creation response includes an identifier of the first service intent.

In this possible implementation, after generating the first service intent, the first management device may return the identifier of the first service intent to the second management device. In this way, for subsequent management of the first service intent, the second management device may perform a management operation by using the identifier of the first service intent as an index.

Based on the technical solution provided in this embodiment of this disclosure, starting from a working interface between the OSS/BSS and the NFV-MANO system, the OSS/BSS is free from complex logic of an NFV-MANO policy, so that the OSS/BSS manages and maintains the service intent more accurately. Managing the NFV MANO object based on the service intent simplifies management operation logic of the OSS/BSS, and reduces complexity of managing the NFV network.

The foregoing describes a process of creating the service intent. The following describes, with reference to FIG. 4, an update process after the intent is created.

Figure 4:
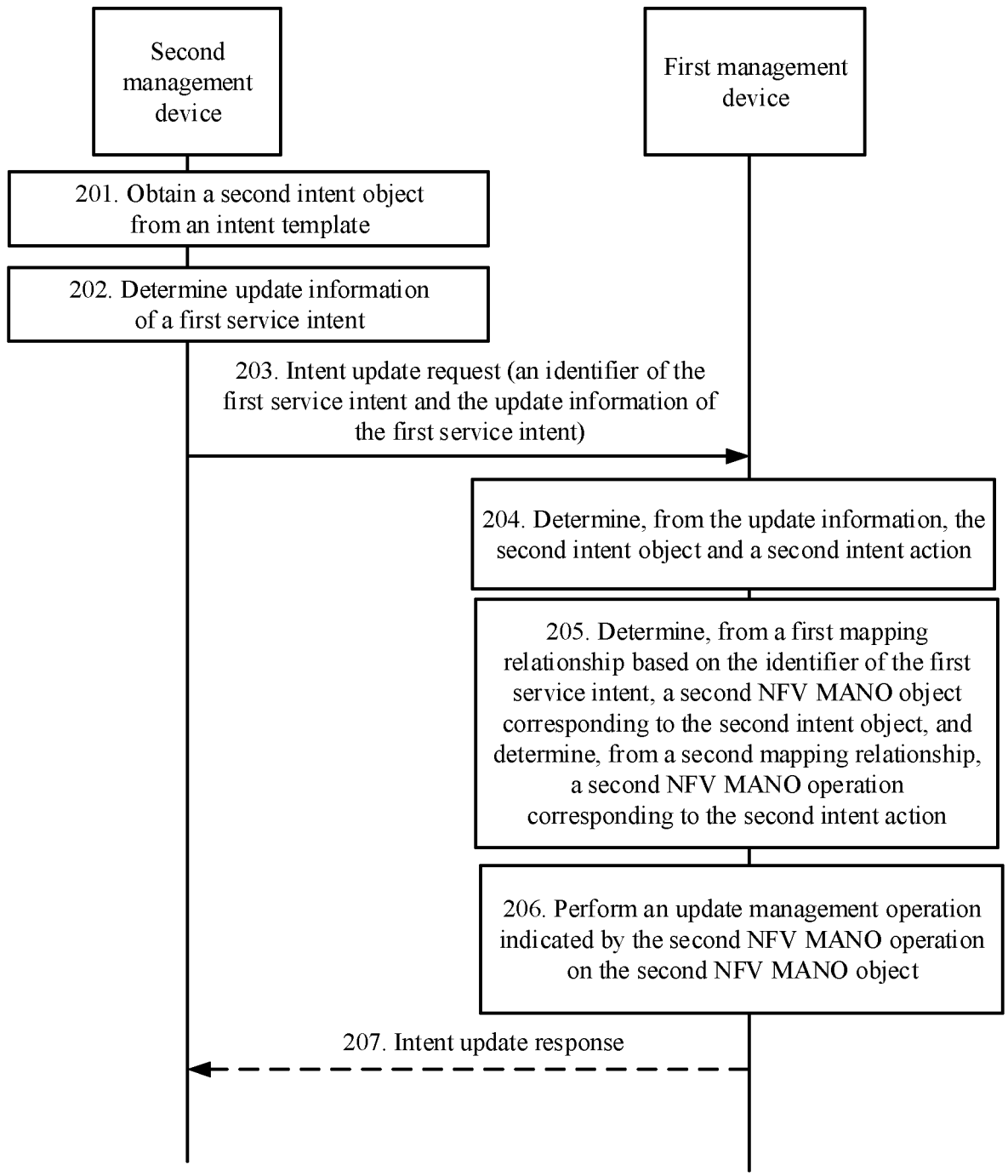
FIG. 4 is a schematic diagram of another embodiment of a method for managing a network service according to an embodiment of this disclosure.

As shown in FIG. 4, another embodiment of a method for managing a network service according to an embodiment of this disclosure may include:

201. A second management device obtains a second intent object from an intent template.

After a first service intent is created, description information of a first intent object in the first service intent may be modified, or some first intents are deleted, or some more intent objects are selected from the intent template to be added to the first service intent. Therefore, the second intent object may be included in the first intent object, or the second intent object is at least one intent object in the intent template except the first intent object.

For partial deletion, addition, and modification, these operations for the first service intent may be collectively referred to as an update operation.

202. The second management device determines update information of the first service intent.

The update information includes description information of the first service intent that corresponds to the second intent object.

If the latency not less than 100 milliseconds in the above creation example is adjusted to be latency not less than 150 milliseconds, the second intent object is a latency, and the description information of the first service intent that corresponds to the second intent object is that the latency is not less than 150 milliseconds.

203. The second management device sends an intent update request to a first management device.

The intent update request includes an identifier of the first service intent and the update information of the first service intent.

204. After receiving the intent update request sent by the second management device, the first management device determines the second intent object and a second intent action from the update information.

In the example of step 202, the second intent object may be the latency, and the second intent action may be "adjust".

205. The first management device determines, from a first mapping relationship based on the identifier of the first service intent, a second NFV MANO object corresponding to the second intent object, and determines, from a second mapping relationship, a second NFV MANO operation corresponding to the second intent action.

The second NFV MANO operation is used to indicate an update management operation to be performed on the second NFV MANO object of the first service intent.

This step may be understood with reference to step 106. After the first service intent is created, the first management device may store a correspondence between the identifier of the first service intent and an identifier of the intent template. Therefore, the first mapping relationship and the second mapping relationship may also be found based on the identifier of the first service intent that is included in the intent update request, so as to determine the second NFV MANO object corresponding to the second intent object and the second NFV MANO operation corresponding to the second intent action.

The determined second NFV MANO operation may adjust the latency 100 ms in step (b) in step 106 to 150 ms.

206. The first management device performs an update management operation indicated by the second NFV MANO operation on the second NFV MANO object.

Step 206 may be performed by the first management device. Alternatively, the first management device may send the second NFV MANO object and the second NFV MANO operation to a third management device, and then the third management device performs the update management operation indicated by the second NFV MANO operation on the second NFV MANO object.

The first management device may be an NFVO, and the third management device may be a VNFM or a VIM. After determining the second NFV MANO operation, the NFVO may send the second NFV MANO operation to the VNFM or the VIM, to perform the second NFV MANO operation. In another possible embodiment, the first management device is a device that is in parallel with the NFVO and that can communicate with an OSS/a BSS, and the third management device is the NFVO, the VNFM, or the VIM. After determining the second NFV MANO operation, the device that is in parallel with the OSS/BSS and that can communicate with the OSS/BSS may send the second NFV MANO operation to the NFVO, the VNFM, or the VIM, to perform the second NFV MANO operation.

The solution for updating the service intent may further include:

207. The first management device sends an intent update response to the second management device.

Based on the solution provided in this embodiment of this disclosure, when management of an NFV network needs to be updated, the second management device may update a managed target by sending the identifier of the first service intent and the description information of the second intent object. This further simplifies operation processing.

Figure 5:
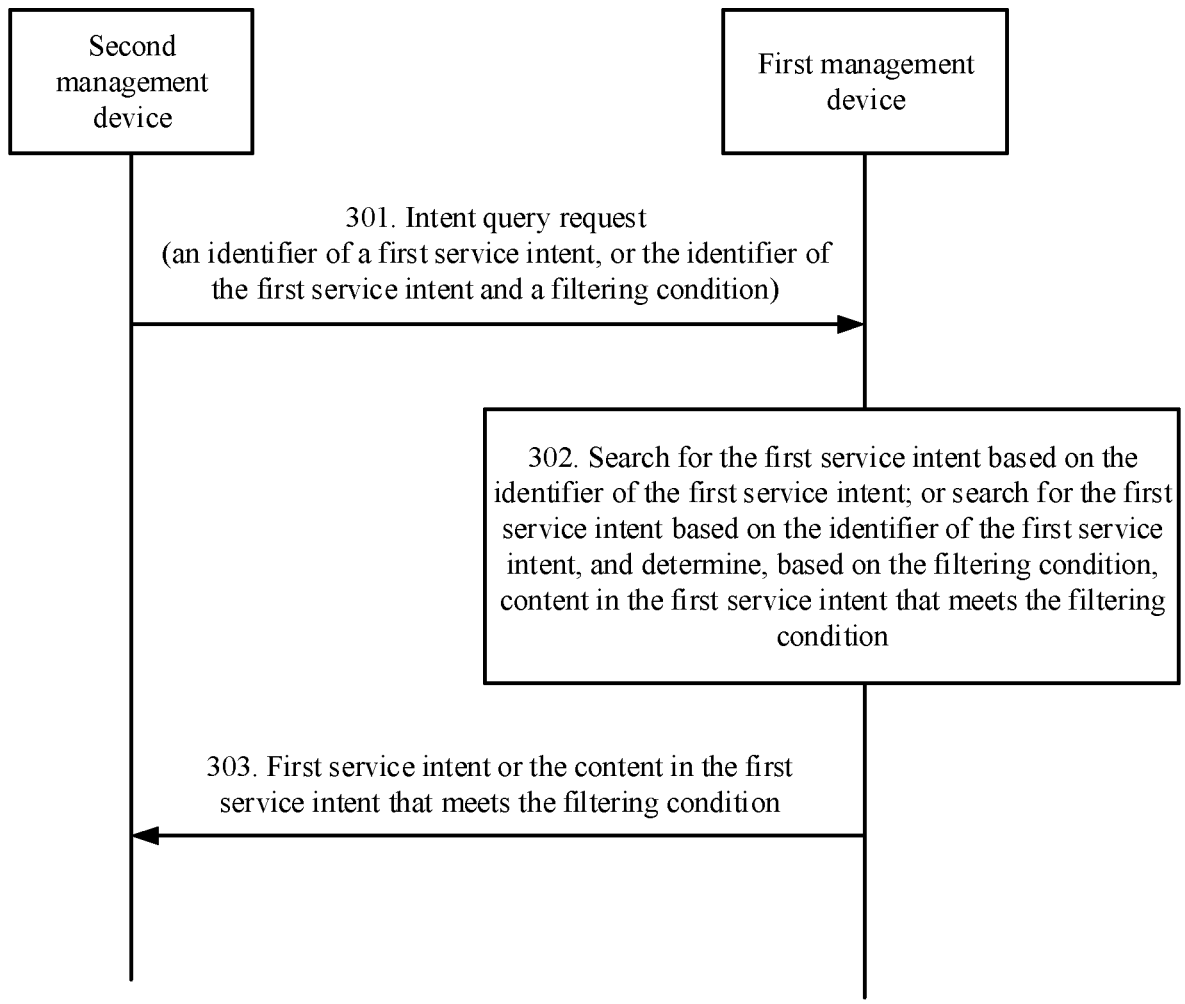
FIG. 5 is a schematic diagram of another embodiment of a method for managing a network service according to an embodiment of this disclosure.

The foregoing describes processes of creating and updating the service intent, and the following describes a process of querying a service intent with reference to FIG. 5.

As shown in FIG. 5, another embodiment of a method for managing a network service according to an embodiment of this disclosure may include:

301. A second management device sends an intent query request to a first management device, where the intent query request includes an identifier of a first service intent, or includes the identifier of the first service intent and a filtering condition.

The intent query request may be input by operation and maintenance personnel, or may be generated by the second management device.

302. After receiving the intent query request sent by the second management device, the first management device searches for the first service intent based on the identifier of the first service intent; or the first management device searches for the first service intent based on the identifier of the first service intent, and determines, based on the filtering condition, content in the first service intent that meets the filtering condition.

The filtering condition may be a time period in the first service intent. In this way, the first management device filters the first service intent based on the time period, so as to determine intent content in the time period.

The filtering condition may alternatively be an identifier or identifiers of one or several intent objects in the first intent object. In this way, the first management device filters the first service intent based on the identifier of the intent object, so as to determine intent content of the intent object that is indicated by the identifier of the intent object.

303. The first management device sends the first service intent to the second management device; or the first management device sends the content in the first service intent that meets the filtering condition to the second management device.

In this embodiment of this disclosure, when a query operation is performed, the second management device sends the identifier of the first service intent or another filtering condition that further narrows a search range, and the first management device may find content required by the second management device. It may be learned from this possible implementation that when the first service intent needs to be queried, the second management device only needs to send the intent query request, and the intent query request carries the identifier of the first service intent, so that the first service intent can be found. This further simplifies operation processing.

Figure 6:
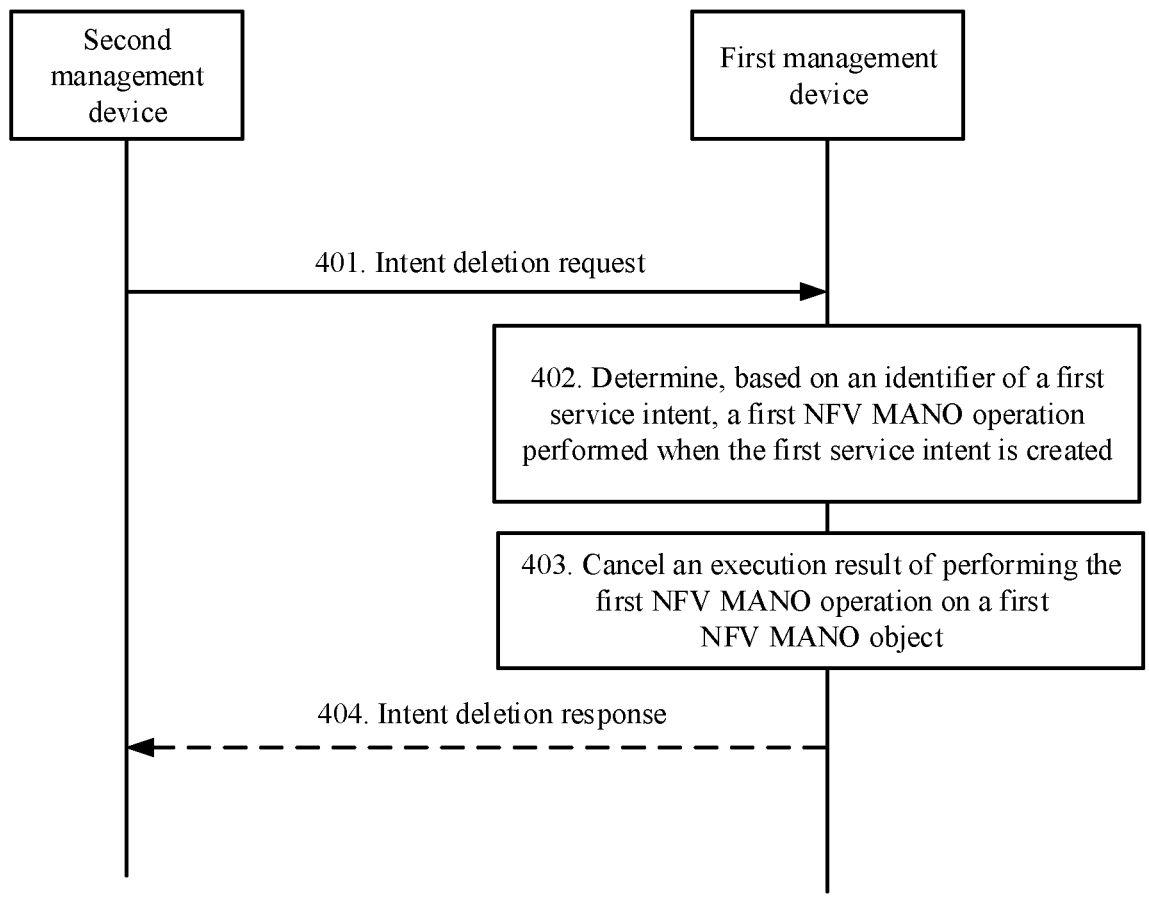
FIG. 6 is a schematic diagram of another embodiment of a method for managing a network service according to an embodiment of this disclosure.

The foregoing describes processes of creating and updating the service intent, and the following describes a process of querying a service intent with reference to FIG. 6.

As shown in FIG. 6, another embodiment of a method for managing a network service according to an embodiment of this disclosure may include:

401. A second management device sends an intent deletion request to a first management device.

The intent deletion request includes an identifier of a first service intent.

The intent deletion request may be input by network operation and maintenance personnel (a network manager), or may be generated by the second management device.

402. After receiving the intent deletion request sent by the second management device, the first management device determines, based on the identifier of the first service intent, a first NFV MANO object and a first NFV MANO operation that are determined when the first service intent is created.

403. The first management device cancels an execution result of performing the first NFV MANO operation on the first NFV MANO object.

If an update operation occurs before canceling is performed, an execution result after a previous update operation is canceled. That is, an execution result of performing a second NFV MANO operation on a second NFV MANO object is canceled.

404. The first management device sends an intent deletion response to the second management device.

In this embodiment of this disclosure, when the first service intent is to be deleted, the second management device sends the intent deletion request to the first management device. The intent deletion request may carry the identifier of the first service intent received in step 108. The identifier of the first service intent may be used to determine the first NFV MANO operation performed when the first service intent is created.

If an instance of the first NFV MANO object is created when the first service intent is created, canceling the execution result of performing the first NFV MANO operation on the first NFV MANO object indicates that the first management device terminates the instance of the first NFV MANO object. If the first management device performs a scale-out operation on the first NFV MANO object when the first service intent is created, canceling the execution result of performing the first NFV MANO operation on the first NFV MANO object indicates that the first management device performs a scale-in operation on the first NFV MANO object in an intent deletion process. It may be learned from this possible implementation that when the first service intent needs to be deleted, the second management device sends the intent deletion request, where the intent deletion request carries the identifier of the first service intent, so as to terminate a network-side instance or implement another management operation. This further simplifies operation processing.

The foregoing describes the system for managing a network service and the management and orchestration method provided in embodiments of this disclosure. With reference to the accompanying drawings, the following describes a management device provided in an embodiment of this disclosure.

Figure 7:
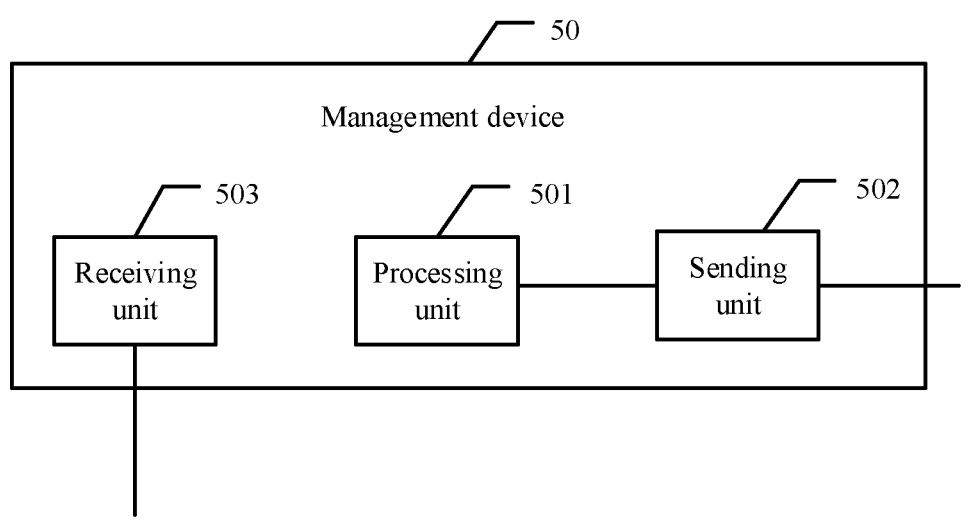
FIG. 7 is a schematic diagram of an embodiment of a management device according to an embodiment of this disclosure.

As shown in FIG. 7, an embodiment of a management device 50 provided in this embodiment of this disclosure may include:

a processing unit 501, configured to obtain a first intent object from an intent template, and determine description information of a first service intent that corresponds to the first intent object; and a sending unit 502, configured to send an intent creation request to a first management device, where the intent creation request is used to request to manage a network service corresponding to the first service intent, and the intent creation request includes an identifier of the intent template and the description information of the first service intent.

Based on the technical solution provided in this embodiment of this disclosure, starting from a working interface between an OSS/a BSS and an NFV-MANO system, the OSS/BSS is free from complex logic of an NFV-MANO policy, so that the OSS/BSS manages and maintains the service intent more accurately. On a second management device side, the intent template and the intent object may be used to manage an NFV MANO object on a first management device side. This simplifies management operation logic of the OSS/BSS, and reduces complexity of managing an NFV network.

In a possible embodiment, the processing unit 501 is configured to obtain, in response to a selection operation on an intent object in the intent template, the first intent object selected in the intent template.

In a possible embodiment, the processing unit 501 is configured to determine the corresponding intent template based on a management service in a field of network operation and maintenance management.

In a possible embodiment, a receiving unit 503 is configured to receive an intent creation response sent by the first management device, where the intent creation response includes an identifier of the first service intent.

In a possible embodiment, the processing unit 501 is further configured to:

obtain a second intent object from the intent template, where the second intent object is included in the first intent object, or the second intent object is at least one intent object in the intent template except the first intent object; and determine update information of the first service intent, where the update information includes description information of the first service intent that corresponds to the second intent object.

The sending unit 502 is further configured to send an intent update request to the first management device. The intent update request is used to request to update the network service corresponding to the first service intent, and the intent update request includes the identifier of the first service intent and the update information of the first service intent.

In a possible embodiment, the sending unit 502 is further configured to send an intent deletion request to the first management device. The intent deletion request includes the identifier of the first service intent, and the intent deletion request is used to request to cancel an operation performed on the network service corresponding to the first service intent.

In a possible embodiment, the sending unit 502 is further configured to send an intent query request to the first management device. The intent query request includes the identifier of the first service intent, or the identifier of the first service intent and a filtering condition. The identifier of the first service intent is used to search for the first service intent. The filtering condition is used to determine content in the first service intent that meets the filtering condition.

The receiving unit 503 is further configured to receive the first service intent or the content in the first service intent that meets the filtering condition, which is sent by the first management device.

In a possible embodiment, the second management device is an OSS/a BSS system of an operator, and the first management device is a network functions virtualization orchestrator NFVO. Alternatively, the second management device is a first NFVO, and the first management device is a second NFVO. The first NFVO and the second NFVO are located in different management domains, and the first NFVO communicates with the second NFVO.

In a possible embodiment, a first NFV MANO object includes a network service NS, a virtualized network function VNF, and a virtual resource. A first NFV MANO operation includes instantiation of the NFV MANO object, scaling out/in of the NFV MANO object, and update of the NFV MANO object.

Because the foregoing described management device is based on a same concept as the method embodiment of this disclosure, a technical effect brought by the foregoing described management device is the same as that of the method embodiment of this disclosure. For specific content, refer to the description of the second management device in the method embodiment of this disclosure, and details are not described herein.

Figure 8:
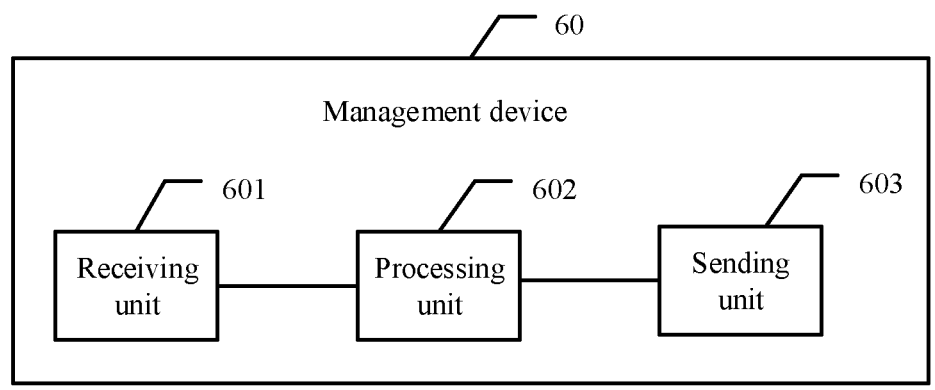
FIG. 8 is a schematic diagram of an embodiment of a management device according to an embodiment of this disclosure.

As shown in FIG. 8, an embodiment of a management device 60 provided in an embodiment of this disclosure may include:

a receiving unit 601, configured to receive an intent creation request sent by a second management device, where the intent creation request includes an identifier of an intent template and description information of a first service intent, and the intent template includes a first intent object; and a processing unit 602, configured to:
determine the first intent object and a first intent action from the description information of the first service intent;
determine a first mapping relationship and a second mapping relationship based on the identifier of the intent template, where the first mapping relationship is a mapping relationship between an intent object and a network functions virtualization management and orchestration NFV MANO object, and the second mapping relationship is a mapping relationship between an intent action and an NFV MANO operation;
determine, from the first mapping relationship, a first NFV MANO object corresponding to the first intent object, and determine, from the second mapping relationship, a first NFV MANO operation corresponding to the first intent action; and
perform management indicated by the first NFV MANO operation on the first NFV MANO object.

Based on the technical solution provided in this embodiment of this disclosure, a first management device may determine, based on the first mapping relationship and the second mapping relationship, the NFV MANO object and the NFV MANO operation that correspond to the description information of the service intent, so as to perform management. This simplifies management operation logic of an OSS/a BSS, and reduces complexity of managing an NFV network.

In a possible embodiment, a sending unit 603 is configured to send the first NFV MANO object and the first NFV MANO operation to a third management device. The first NFV MANO operation is used by the third management device to perform the management indicated by the first NFV MANO operation on the first NFV MANO object.

In a possible embodiment, the sending unit 603 is configured to send an intent creation response to the second management device. The intent creation response includes an identifier of the first service intent.

In a possible embodiment, the receiving unit 601 is further configured to receive an intent update request sent by the second management device. The intent update request includes the identifier of the first service intent and update information of the first service intent.

The processing unit 602 is further configured to:
determine a second intent object and a second intent action from the update information;
determine, from the first mapping relationship based on the identifier of the first service intent, a second NFV MANO object corresponding to the second intent object, and determine, from the second mapping relationship, a second NFV MANO operation corresponding to the second intent action; and
perform an update management operation indicated by the second NFV MANO operation on the second NFV MANO object.

In a possible embodiment, the receiving unit 601 is further configured to receive an intent deletion request sent by the second management device. The intent deletion request includes the identifier of the first service intent.

The processing unit 602 is further configured to: determine, based on the identifier of the first service intent, the first NFV MANO object and the first NFV MANO operation that are determined when the first service intent is created, and cancel an execution result of performing the first NFV MANO operation on the first NFV MANO object.

In a possible embodiment, the receiving unit 601 is further configured to receive an intent query request sent by the second management device. The intent query request includes the identifier of the first service intent, or the identifier of the first service intent and a filtering condition.

The processing unit 602 is further configured to search for the first service intent based on the identifier of the first service intent; or search for the first service intent based on the identifier of the first service intent, and determine, based on the filtering condition, content in the first service intent that meets the filtering condition.

The sending unit 603 is further configured to send the first service intent or the content in the first service intent that meets the filtering condition to the second management device.

In a possible embodiment, the second management device is an OSS/a BSS system of an operator, the first management device is a network functions virtualization orchestrator NFVO, and the third management device is a virtualized network function manager VNFM or a virtualized infrastructure manager VIM.

In a possible embodiment, the first NFV MANO object includes a network service NS, a virtualized network function VNF, and a virtual resource. The first NFV MANO operation includes instantiation of the NFV MANO object, scaling out/in of the NFV MANO object, and update of the NFV MANO object.

Because the foregoing described management device is based on a same concept as the method embodiment of this disclosure, a technical effect brought by the foregoing described management device is the same as that of the method embodiment of this disclosure. For specific content, refer to the description of the first management device in the method embodiment of this disclosure, and details are not described herein.

An embodiment of this disclosure further provides a computer storage medium. The computer storage medium stores a program, and the program is used to perform some or all of the steps described in the foregoing method embodiments.

Figure 9:
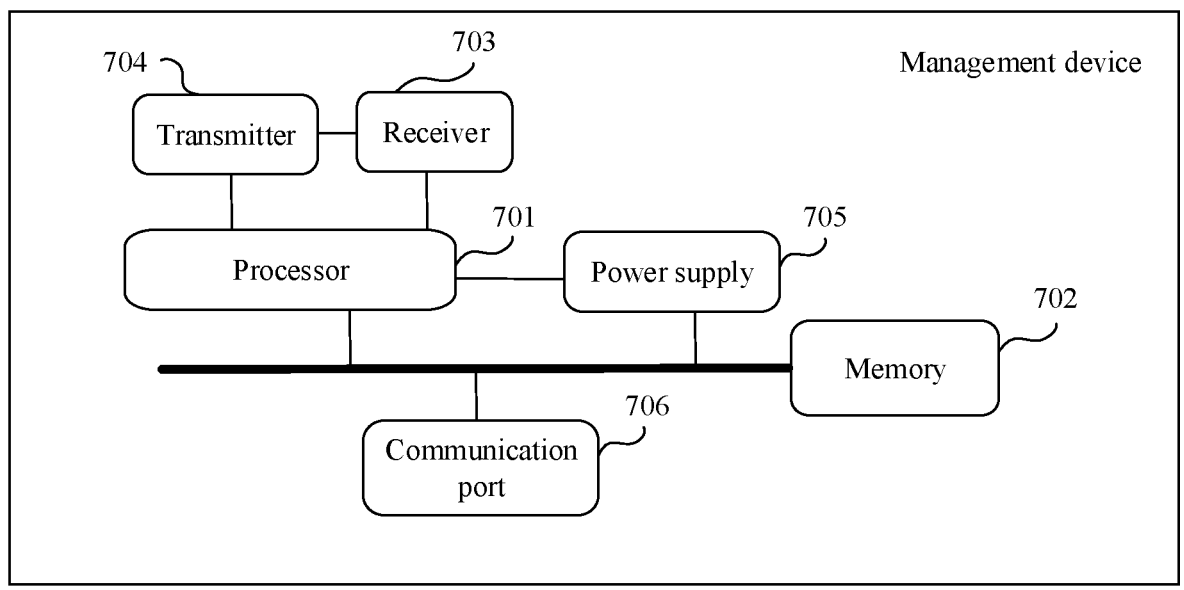
FIG. 9 is a schematic diagram of an embodiment of a management device according to an embodiment of this disclosure.

FIG. 9 is a schematic diagram of a structure of still another management device according to an embodiment of this disclosure. The management device may be a server, or may be another device that can implement the function of this disclosure, for example, a first management device or a second management device.

The management device may include a processor 701 (such as a CPU), a memory 702, a transmitter 704, and a receiver 703. The transmitter 704 and the receiver 703 are coupled to the processor 701. The processor 701 controls a sending action of the transmitter 704 and a receiving action of the receiver 703. The memory 702 may include a high-speed RAM memory, or may include a nonvolatile memory NVM, for example, at least one magnetic disk memory. The memory 702 may store various instructions used to perform various processing functions and implement the method steps in embodiments of this disclosure. The processor 701 and the memory 702 may be implemented in a virtualized manner in FIG. 2.

Optionally, the management device in this embodiment of this disclosure may further include one or more of a power supply 705 and a communication port 706. The components described in FIG. 9 may be connected through a communications bus, or may be connected by using another connection manner. This is not limited in this embodiment of this disclosure. The receiver 703 and the transmitter 704 may be integrated into a transceiver of the management device, or may be independent receiving and transmitting antennas on the management device. The communications bus is configured to implement a communications connection between elements. The communication port 706 is configured to implement connection and communication between the management device and another peripheral.

In some embodiments, the memory 702 is configured to store computer executable program code. The program code includes instructions. When the processor 701 executes the instructions, the processor 701 in the management device may execute an action executed by the processing unit 501 in FIG. 7; the receiver 703 or the communication port 706 in the management device may execute an action executed by the receiving unit 503 in FIG. 7; and the transmitter 704 or the communication port 706 in the management device may execute an action executed by the sending unit 502 in FIG. 7. Implementation principles and technical effects thereof are similar, and are not described herein.

In some embodiments, the memory 702 is configured to store computer executable program code. The program code includes instructions. When the processor 701 executes the instructions, the processor 701 in the management device may execute an action executed by the processing unit 602 in FIG. 8; the receiver 703 or the communication port 706 in the management device may execute an action executed by the receiving unit 601 in FIG. 8; and the transmitter 704 or the communication port 706 in the management device may execute an action executed by the sending unit 603 in FIG. 8. Implementation principles and technical effects thereof are similar, and are not described herein.

This disclosure further provides a chip system. The chip system includes a processor, configured to support the foregoing management device to implement functions related to the management device, for example, receiving or processing data and/or information in the foregoing method embodiments. In a possible design, the chip system further includes a memory. The memory is configured to store program instructions and data that are necessary for a computer device. The chip system may include a chip, or may include a chip and another discrete component.

All or some of the foregoing embodiments may be implemented by software, hardware, firmware, or any combination thereof. When the software is used to implement the embodiments, all or some of the embodiments may be implemented in a form of a computer program product.

The computer program product includes one or more computer instructions. When the computer program instructions are loaded and executed on a computer, all or some of the procedures or functions are generated according to embodiments of this disclosure. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk solid-state disk (SSD)), or the like.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be allocated on a plurality of network units. Some or all of the units may be selected according to actual requirements to achieve the objectives of the solutions of the embodiments.

In addition, functional units in embodiments of this disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and sold or used as an independent product, the integrated unit may be stored in a computer-readable storage medium. Based on such an understanding, the technical solutions of this disclosure essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this disclosure. The foregoing storage medium includes: any medium that can store program code, such as a USB flash drive, a removable hard disk, a read-only memory (Read-Only Memory, ROM), a random access memory (Random Access Memory, RAM), a magnetic disk, or a compact disc.

What is claimed is:

1. A method for managing a network service, comprising:
    obtaining, by a second management device, a first intent object from an intent template;
    determining, by the second management device, description information of a first service intent that corresponds to the first intent object; and
    sending, by the second management device, an intent creation request to a first management device, wherein the intent creation request is used to request to manage a network service corresponding to the first service intent, and the intent creation request comprises an identifier of the intent template and the description information of the first service intent;
    receiving, by the first management device, the intent creation request sent by a second management device, wherein the description information of the first service intent comprises a first intent object in the intent template;

determining, by the first management device, a first intent action from the description information of the first service intent;

determining, by the first management device, a first mapping relationship and a second mapping relationship based on the identifier of the intent template, wherein the first mapping relationship is a mapping relationship between an intent object and a network functions virtualization management and orchestration NFV MANO object, and the second mapping relationship is a mapping relationship between an intent action and an NFV MANO operation;

determining, by the first management device from the first mapping relationship, a first NFV MANO object corresponding to the first intent object, and determining, from the second mapping relationship, a first NFV MANO operation corresponding to the first intent action; and performing, by the first management device, management indicated by the first NFV MANO operation on the first NFV MANO object.

2. The method according to claim 1, wherein the performing, by the first management device, management indicated by the first NFV MANO operation on the first NFV MANO object comprises:

sending, by the first management device, the first NFV MANO object and the first NFV MANO operation to a third management device, wherein the first NFV MANO operation is used by the third management device to perform the management indicated by the first NFV MANO operation on the first NFV MANO object.

3. The method according to claim 1, wherein the method further comprises:

sending, by the first management device, an intent creation response to the second management device, wherein the intent creation response comprises an identifier of the first service intent.

4. The method according to claim 3, wherein the method further comprises:

receiving, by the first management device, an intent update request sent by the second management device, wherein the intent update request comprises the identifier of the first service intent and update information of the first service intent;

determining, by the first management device from the update information, a second intent object and a second intent action;

determining, by the first management device from the first mapping relationship based on the identifier of the first service intent, a second NFV MANO object corresponding to the second intent object, and determining, from the second mapping relationship, a second NFV MANO operation corresponding to the second intent action; and performing, by the first management device, an update management operation indicated by the second NFV MANO operation on the second NFV MANO object.

5. The method according to claim 3, wherein the method further comprises:

receiving, by the first management device, an intent deletion request sent by the second management device, wherein the intent deletion request comprises the identifier of the first service intent;

determining, by the first management device based on the identifier of the first service intent, the first NFV MANO object and the first NFV MANO operation that are determined when the first service intent is created; and canceling, by the first management device, an execution result of performing the first NFV MANO operation on the first NFV MANO object.

6. The method according to claim 1, wherein the second management device is an OSS/a BSS system of an operator, and the first management device is a network functions virtualization orchestrator NFVO.

7. The method according to claim 1, wherein the first NFV MANO object comprises a network service NS, a virtualized network function VNF, or a virtual resource, and the first NFV MANO operation comprises instantiation of the first NFV MANO object, scaling out/in of the first NFV MANO object, update of the first NFV MANO object, termination of the first NFV MANO object, or healing of the first NFV MANO object.

8. The method according to claim 1, wherein the obtaining, by a second management device, a first intent object from an intent template comprises:

obtaining, by the second management device in response to a selection operation on an intent object in the intent template, the first intent object selected in the intent template.

9. The method according to claim 1, wherein the method further comprises:

determining, by the second management device, the corresponding intent template based on a management service in a field of network operation and maintenance management.

10. The method according to claim 1, wherein the method further comprises:

receiving, by the second management device, an intent creation response sent by the first management device, wherein the intent creation response comprises an identifier of the first service intent.

11. The method according to claim 10, wherein the method further comprises:

obtaining, by the second management device, a second intent object from the intent template;

determining, by the second management device, update information of the first service intent, wherein the update information comprises the description information of the first service intent that corresponds to the second intent object; and sending, by the second management device, an intent update request to the first management device, wherein the intent update request is used to request to update the network service corresponding to the first service intent, and the intent update request comprises the identifier of the first service intent and the update information of the first service intent.

12. The method according to claim 10, wherein the method further comprises:

sending, by the second management device, an intent deletion request to the first management device, wherein the intent deletion request comprises the identifier of the first service intent, and the intent deletion request is used to request to cancel an operation performed on the network service corresponding to the first service intent.

13. The method according to claim 10, wherein the method further comprises:

sending, by the second management device, an intent query request to the first management device, wherein the intent query request comprises the identifier of the first service intent, and the identifier of the first service intent is used to search for the first service intent; and
receiving, by the second management device, the first service intent sent by the first management device.

14. A communication system apparatus, comprising a first management device and a second management device,
wherein the second management device comprises:
a transceiver;
at least one processor; and
one or more memories coupled to the at least one processor and storing programming instructions for execution by the at least one processor to cause the second management device to:
obtain a first intent object from an intent template;
determine description information of a first service intent that corresponds to the first intent object; and
send an intent creation request to a first management device, wherein the intent creation request is used to request to manage a network service corresponding to the first service intent, and the intent creation request comprises an identifier of the intent template and the description information of the first service intent;
wherein the first management device comprises:
a transceiver;
at least one processor; and
one or more memories coupled to the at least one processor and storing programming instructions for execution by the at least one processor to cause the first management device to:
receive the intent creation request sent by the second management device, wherein the description information of the first service intent comprises a first intent object in the intent template;
determine a first intent action from the description information of the first service intent;
determine a first mapping relationship and a second mapping relationship based on the identifier of the intent template, wherein the first mapping relationship is a mapping relationship between an intent object and a network functions virtualization management and orchestration NFV MANO object, and the second mapping relationship is a mapping relationship between an intent action and an NFV MANO operation;
determine from the first mapping relationship, a first NFV MANO object corresponding to the first intent object, and determining, from the second mapping relationship, a first NFV MANO operation corresponding to the first intent action; and
perform management indicated by the first NFV MANO operation on the first NFV MANO object.

15. The system according to claim 14, wherein the programming instructions, when executed by the at least one processor, cause the first management device to:
send the first NFV MANO object and the first NFV MANO operation to a third management device, wherein the first NFV MANO operation is used by the third management device to perform the management indicated by the first NFV MANO operation on the first NFV MANO object.

16. The system according to claim 14, wherein the programming instructions, when executed by the at least one processor, cause the first management device to:
send an intent creation response to the second management device, wherein the intent creation response comprises an identifier of the first service intent;
wherein the programming instructions, when executed by the at least one processor, cause the second management device to:
receive the intent creation response.

17. The system according to claim 16, wherein the programming instructions, when executed by the at least one processor, cause the second management device to:
obtain a second intent object from the intent template;
determine update information of the first service intent, wherein the update information comprises the description information of the first service intent that corresponds to the second intent object; and
send an intent update request to the first management device, wherein the intent update request is used to request to update the network service corresponding to the first service intent, and the intent update request comprises the identifier of the first service intent and the update information of the first service intent; and
wherein the programming instructions, when executed by the at least one processor, cause the first management device to:
receive the intent update request sent by the second management device;
determine from the update information, a second intent object and a second intent action;
determine from the first mapping relationship based on the identifier of the first service intent, a second NFV MANO object corresponding to the second intent object, and determining, from the second mapping relationship, a second NFV MANO operation corresponding to the second intent action; and
perform an update management operation indicated by the second NFV MANO operation on the second NFV MANO object.

18. The system according to claim 16, wherein the programming instructions, when executed by the at least one processor, cause the second management device to:
send an intent deletion request to the first management device, wherein the intent deletion request comprises the identifier of the first service intent, and the intent deletion request is used to request to cancel an operation performed on the network service corresponding to the first service intent;
wherein the programming instructions, when executed by the at least one processor, cause the first management device to:
receive the intent deletion request sent by the second management device;
determine based on the identifier of the first service intent, the first NFV MANO object and the first NFV MANO operation that are determined when the first service intent is created; and
cancel an execution result of performing the first NFV MANO operation on the first NFV MANO object.

19. The system according to claim 14, wherein the second management device is an OS S/a BSS system of an operator, and the first management device is a network functions virtualization orchestrator NFVO.

20. The system according to claim 14, wherein the first NFV MANO object comprises a network service NS, a virtualized network function VNF, or a virtual resource, and the first NFV MANO operation comprises instantiation of the first NFV MANO object, scaling out/in of the first NFV MANO object, update of the first NFV MANO object, termination of the first NFV MANO object, or healing of the first NFV MANO object.

21. The system according to claim 14, wherein the programming instructions, when executed by the at least one processor, cause the second management device to:
   obtain in response to a selection operation on an intent object in the intent template, the first intent object selected in the intent template.

22. The system according to claim 14, wherein the programming instructions, when executed by the at least one processor, cause the communication apparatus to:
   determine the corresponding intent template based on a management service in a field of network operation and maintenance management.

23. The system according to claim 14, wherein the programming instructions, when executed by the at least one processor, cause the second management device to:
   send an intent query request to the first management device, wherein the intent query request comprises the identifier of the first service intent, and the identifier of the first service intent is used to search for the first service intent; and
   receive the first service intent sent by the first management device.

* * * * *